US010289618B2

(12) United States Patent
Fink et al.

(10) Patent No.: US 10,289,618 B2
(45) Date of Patent: *May 14, 2019

(54) THIRD PARTY SEARCH APPLICATIONS FOR A SEARCH SYSTEM

(71) Applicant: Google LLC, Mountain View, CA (US)

(72) Inventors: Michael Fink, Tel Aviv (IL); Niv Efron, Tel Aviv (IL); Eyal Fink, Tel Aviv (IL); Alex Gontmakher, Ness Ziona (IL); Anatoly Vorobey, Tel Aviv (IL); Yossi Matias, Tel Aviv (IL); Jack Wright Menzel, Mountain View, CA (US); Asaph Arnon, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,758

(22) Filed: Jul. 9, 2018

(65) Prior Publication Data

US 2018/0314736 A1 Nov. 1, 2018

Related U.S. Application Data

(63) Continuation of application No. 13/960,302, filed on Aug. 6, 2013, now Pat. No. 10,019,484.

(Continued)

(51) Int. Cl.
*G06F 17/30* (2006.01)
*G06F 16/2455* (2019.01)
(Continued)

(52) U.S. Cl.
CPC ...... *G06F 16/24553* (2019.01); *G06F 16/951* (2019.01); *G06F 21/53* (2013.01); *G06F 21/74* (2013.01)

(58) Field of Classification Search
CPC ......... G06F 17/30483; G06F 17/30864; G06F 21/53; G06F 21/74; G06F 16/24553; G06F 16/951
See application file for complete search history.

(56) References Cited

U.S. PATENT DOCUMENTS 6,295,528 B1* 9/2001 Marcus ............ G06F 17/30241
101/101
6,904,433 B2* 6/2005 Kapitskaia ........ G06F 17/30457
(Continued)

FOREIGN PATENT DOCUMENTS

| CN | 101231636 A | 7/2008 |
| CN | 101578862 A | 11/2009 |
| CN | 103034704 A | 4/2013 |

OTHER PUBLICATIONS

"Interactive Snippets", retrieved from https://github.com/bobuk/islands/blob/master/interactive-answers-eng.md, May 29, 2013, 7 pages.

(Continued)

*Primary Examiner* — Jared M Bibbee
(74) *Attorney, Agent, or Firm* — Brake Hughes Bellermann LLP

(57) ABSTRACT

Systems and methods offer a search system with third-party provided search applications that are triggered in response to specified queries and run at the search system. For example, a method may include determining that a query triggers a third party search application hosted at the search system, executing the third party search application at the search system using computer-instructions obtained from the third party to generate and format a third-party formatted answer for the query, and providing the third-party formatted answer as a search result for the query. The third party may provide the query template, parameter attributes, if any, and the third party formatted answer. The third party search application is (Continued)

stored at the search system and may include the query template, a data store, the parameter attributes, and computer-instructions for accessing the data store using the parameter.

21 Claims, 8 Drawing Sheets

Related U.S. Application Data

(60) Provisional application No. 61/847,371, filed on Jul. 17, 2013.

(51) Int. Cl.
*G06F 16/951* (2019.01)
*G06F 21/53* (2013.01)
*G06F 21/74* (2013.01)

(56) References Cited

U.S. PATENT DOCUMENTS

| | | | | |
|---|---|---|---|---|
| 2001/0032205 | A1* | 10/2001 | Kubaitis | G06F 17/30864 |
| 2005/0065967 | A1* | 3/2005 | Schuetze | G06F 17/3092 |
| 2005/0114306 | A1* | 5/2005 | Shu | G06F 17/30867 |
| 2006/0015483 | A1* | 1/2006 | Gownder | G06F 17/3041 |
| 2006/0224570 | A1* | 10/2006 | Quiroga | G06F 17/278 |
| 2008/0208567 | A1* | 8/2008 | Brockett | G06F 17/273 |
| | | | | 704/9 |
| 2009/0019020 | A1* | 1/2009 | Dhillon | G06F 17/30398 |
| 2009/0027392 | A1* | 1/2009 | Jadhav | G06F 17/30958 |
| | | | | 345/440 |
| 2010/0070448 | A1* | 3/2010 | Omoigui | H01L 27/1463 |
| | | | | 706/47 |
| 2010/0306678 | A1* | 12/2010 | Kulas | G06F 3/04812 |
| | | | | 715/760 |
| 2011/0083167 | A1* | 4/2011 | Carpenter | G06F 17/30563 |
| | | | | 726/4 |
| 2012/0174236 | A1* | 7/2012 | Goodwin | H04L 63/102 |
| | | | | 726/27 |
| 2012/0290620 | A1* | 11/2012 | Guan | G06F 17/30389 |
| | | | | 707/779 |
| 2013/0012179 | A1* | 1/2013 | Watkins | H04L 67/34 |
| | | | | 455/418 |
| 2013/0024448 | A1* | 1/2013 | Herbrich | G06F 17/30864 |
| | | | | 707/728 |
| 2013/0198726 | A1* | 8/2013 | Smith | G06F 8/40 |
| | | | | 717/136 |
| 2013/0238609 | A1* | 9/2013 | Marantz | G06F 17/30864 |
| | | | | 707/723 |
| 2013/0276136 | A1* | 10/2013 | Goodwin | H04L 67/22 |
| | | | | 726/27 |
| 2013/0290289 | A1* | 10/2013 | Yu | G06F 17/30867 |
| | | | | 707/706 |
| 2014/0006370 | A1* | 1/2014 | Keshri | G06F 17/30864 |
| | | | | 707/706 |
| 2014/0101739 | A1* | 4/2014 | Li | G06F 21/30 |
| | | | | 726/7 |

OTHER PUBLICATIONS

International Search Report and Written Opinion for PCT Application No. PCT/US2014/046638, dated Nov. 4, 2014, 11 pages.

Yobot, et al., "Sandbox (computer security)", Wikipedia, the free encyclopedia, retrieved on Oct. 27, 2014 from http://en.wikipedia.org/w/index.php?title=Sandbox_%28computer_security%29&oldid=559028603, Jun. 9, 2013, 2 pages.

Office Action with English translation for Chinese Application No. 201480040539.8, dated Sep. 29, 2018, 39 pages.

* cited by examiner

Third Party Search Application — 200

- App Id: miliage_app — 205
- Site: www.geomaps.org — 210

Trigger:
- How far is $destination ⊠ — 215
- How many miles to $destination ⊠ — 217

Add Trigger

Parameters: ☑ Include query context — 220

- Name: destination — 225
- Type: entity ▼ — 230
- Id: /g/1248s/city_ — 235

Add Parameter

Data Tables:

- Type: spreadsheet ▼ — 240
- Source: [browse] — 245
- Name: distances — 250
- Key By: entity_id — 255

CHECK — 260

Add Data Table

Code: — 265

```
def __main__(destination, context) :
    distances = datastore.fetch('distances', destination, context.location)
    if (distances == none)
        return NONE
    return '%s is %i miles from %s (%i km)' % (destination,
distances['miles'], context.location['city_name'], distances['km'])
```
— 270

SAVE

THIRD PARTY SEARCH APPLICATIONS FOR A SEARCH SYSTEM

CROSS-REFERENCE TO RELATED APPLICATIONS

This application is a Continuation of, and claims priority to, U.S. patent application Ser. No. 13/960,302, filed on Aug. 6, 2013, entitled "THIRD PARTY SEARCH APPLICATIONS FOR A SEARCH SYSTEM", which, in turn, claims priority to U.S. Patent Application No. 61/847,371, filed on Jul. 17, 2013, entitled "THIRD PARTY SEARCH APPLICATIONS FOR A SEARCH SYSTEM", the disclosures of which are incorporated by reference herein in their entirety.

BACKGROUND

Search engines or search systems are a popular method of discovering information. Traditionally, search engines crawl documents in a corpus, generate an inverted index for the documents, and use the index to determine which documents are responsive to a search query. Search results commonly include a title from a responsive document and a snippet of text from the document that includes one or more of the search terms in the query. While search engines provide such results based this indexing of web content, search engines conventionally do not provide results from web content that is dynamically generated using data hosted by third parties or for content that changes with high frequency (where "third parties" include any server or site that is not controlled by the search engine). To address some of these issues, some search engines license data hosted by the third party and index the licensed data. For example, a search engine may license weather information or stock market information. But this method does not scale easily because each new input requires interaction between human operators of the search engine and the third party.

SUMMARY

Some implementations offer a search system with an interface that allows third parties to provide a search application that is triggered in response to specified queries. The interface may allow the third party to provide the criteria for triggering the search application, to provide parameter information, and to provide data for generating one or more query answers for a query. Some implementations also allow the third party to provide instructions for accessing the data and/or generating a natural language answer using the parameter information. The data, triggering criteria, and instructions for manipulating the data may be stored on the search system, making the execution of the search application fast because the search system need not communicate with a third party site to execute the search application. The application may run in a sandbox on the search system to avoid any ill effects on the search system caused by third parties with malicious intent. To further ensure the quality of answers provided by third party search applications, the search system may allow users to report irrelevant responses or may monitor whether other responses are selected by the query requester. Because the application is hosted at the search engine, the search engine may disable any third party search application that generates irrelevant or undesirable results or causes undesirable effects at the search system.

One aspect of the disclosure can be embodied in a computer-implemented method that includes generating, using at least one processor of a search system, first answers for a query from an inverted index for a document corpus and determining, using the at least one processor, that the query corresponds to a query template, the query template being associated with a third party search application hosted at the search system. Responsive to the determining, the method may include extracting a parameter from the query based on the query template, generating, using the at least one processor of the search system, a third-party formatted answer for the query by providing the parameter to the third party search application and executing the third party search application in a sandboxed environment, and providing the third-party formatted answer with the first answers as a search result for the query. In some implementations generating the third-party formatted answer occurs without communications with a system hosted by the third party. In some implementations the sandboxed environment runs on a system co-located or internally networked with the search system. In some implementations the search system controls the resources available to the third-party search application as part of the sandboxed environment. The first answers may be generated concurrently with the third-party formatted answer.

The method can include one or more of the following features. For example, the third party search application can include a data store and instructions for accessing the data store and the third party search application may generate the third-party formatted answer by using the parameter to look up a record in the data store and using a field from the record to generate the third-party formatted answer. In some implementations, the method may also include receiving updated data for the data store from the third party on a periodic basis and updating the data store. In some implementations, the method may also include receiving, at the search system, the query template, information describing the parameter, information describing the data store, and instructions for accessing the data store from the third party. In some implementations the instructions may be received from an operator of the search system.

As another example, the third party search application may include instructions for performing a calculation on the parameter as part of executing the third party search application. As another example, the third-party formatted answer may consist of a sentence determined by the third party that includes the parameter determined from the query. In some implementations the method may also include extracting a second parameter from a context of the query and providing the second parameter to the third party search application. The third-party formatted answer may include a sentence that contains the second parameter. The context of the query may include one of a location of a query requester, a date and time for the query, and a user-id of the query requester.

As another example, the method may include repeating the generating, determining, extracting, and providing over multiple queries, monitoring a quantity of times the first answers are selected, and, when the quantity of times meets a threshold, disabling the query template. In some implementations determining that the query corresponds to the query template can include determining a source for the query template and determining that signals for the source meet a threshold before determining that the query corresponds to the query template. In some implementations the third-party formatted answer includes a deep link that incorporates the parameter.

Another aspect of the disclosure can be embodied in a computer system that includes at least one processor and memory storing instructions that, when executed by the at least one processor, cause the search system to perform operations. The operations include receiving a query template from a third-party, the query template comprising a regular expression with at least one parameter. The operations may also include receiving one or more attributes for the parameter from the third party and receiving a data store from the third party. The data store may include attributes and data. The operations may also include receiving, from the third party, instructions for accessing the data store using the parameter and storing the data for the data store, the attributes of the data store, the parameter attributes, and the query template at the search system as a third party search application. The receiving and storing can occur automatically without intervention of a human operator of the search system.

The system can include one or more of the following features. For example, the receiving and storing may be repeated for a plurality of distinct third parties and the system may provide more than one third-party formatted answer to a query when more than one third-party search application has a query template that matches the query. As another example, the operations may also include determining that the query corresponds to the query template, generating a third-party formatted answer for the query and executing the instructions for accessing the data store, and providing the third-party formatted answer as a search result for the query. Generating the third-party formatted answer may include providing a parameter value extracted from the query to the third party search application. The search system may generate the third-party formatted answer at query time without communicating with a third party server. The third-party formatted answer may be provided with a link that allows a query requester to indicate dissatisfaction with the answer. The system may also include an inverted index of documents in a document corpus and the operations may also include generating snippet-based answers for the query by searching the index of documents responsive to the query, and providing the snippet-based answers and the third-party formatted answer as the search result for the query.

As another example, the system may also include a graph-based data store storing entities linked by relationships, and the attributes for the parameter may include an entity collection for the graph-based data store. In such an implementation, generating the third-party formatted answer may include determining a portion of the query that corresponds to the parameter of the query template, determining that the portion of the query corresponds to an attribute of an entity in the entity collection, and providing the attribute of the entity as the parameter value to the third party search application.

In some implementations, the third-party search application is one of a plurality of third-party search applications hosted at the search system and generating the third-party formatted answer includes evaluating query templates associated with the plurality of third-party search applications to determine query templates that correspond to the query, generating respective third-party formatted answers for the query templates that correspond to the query, and providing the respective third-party formatted answers as part of the search result. In some implementations, the instructions for accessing the data store are provided by an administrator of the search system and in some implementations, the third party provides the instructions for accessing the data store. The search system may integrate the instructions and the data store with a query engine autonomously of a human operator of the search system.

Another aspect of the disclosure can be embodied in a search system that includes at least one processor and memory storing instructions that, when executed by the at least one processor, cause the search system to perform operations. The operations may include determining that a query triggers a third party search application hosted at the search system. The third party search application may be one of a plurality of third party search applications hosted at the search system. The operations may also include extracting a parameter from the query based on a query template associated with the third party search application and executing the third party search application with the parameter in a sandboxed manner at the search system. Executing the third party search application may generate a third-party formatted answer for the query and the operations may include providing the third-party formatted answer as a search result for the query.

The system can include one or more of the following features. For example, the third-party formatted answer may include a deep link to a website associated with the third party search application and/or a link that, when selected by a query requester, indicates disapproval of the third-party formatted answer. As another example, determining that the query triggers the third party search application may include determining that the query includes a pronoun and substituting the pronoun in the query with a noun from a previous query submitted by a query requester of the query.

As another example, the system may include an inverted index for documents in a document corpus and the operations may also include generating first answers for the query from the inverted index and providing the first answers with the third-party formatted answer as the search result. In some implementations, the third-party formatted answer may be provided in a position of prominence with regard to the first answers. In some implementations, determining that the query triggers the third party search application can include determining that a website associated with the third party search application appears in the first answers. In some implementations, determining that the website appears in the first answers may dependent on a ranking signal for the website meeting a signal threshold.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, the third party search applications may offer many additional answers that directly answer a web query, providing the query requesters with a richer search experience. Additionally, the third party query responses may be written in a natural language format rather than a snippet format, which makes the answer easier for the query requester to comprehend. Natural language answers are answers that form a complete thought, for example in a sentence, paragraph and/or list format. The answers may also provide a deep link to the third party affiliated site, allowing the query requester to get additional information in a more direct manner. The answers provided by the third party search applications are of high quality because they are tailored to the query. The search engine can ensure the quality of such answers by monitoring the usefulness of the answer to the requester and/or the relevance of a site operated by the third party to the query. In some implementations, the answers provided by third parties may be included prior to snippet-type search results, making the answers easy and intuitive to locate or to read out to the user using text-to-speech technology.

As another example, the system scales to a large level because third parties can initiate the third party search application automatically—without having to negotiate with human operators of the search engine. The answers provided by the third party search applications may be provided with minimal delay, for example less than 20 ms, because the answers are generated at the search system rather than at third-party sites. The third party can control how often updated data is provided to the search application, thus controlling the freshness of answers generated by their search applications. Finally, the system can ensure that the third party applications do not adversely affect search engine processes through sandboxing and may remove or disable third party search applications that query requesters do not find helpful or that attempt to adversely affect resources.

The details of one or more implementations are set forth in the accompanying drawings and the description below. Other features will be apparent from the description and drawings, and from the claims.

BRIEF DESCRIPTION OF DRAWINGS

FIG. 2 illustrates an example of an interface for assembling a third party search application, consistent with disclosed implementations.

Like reference symbols in the various drawings indicate like elements.

DETAILED DESCRIPTION

Figure 1:
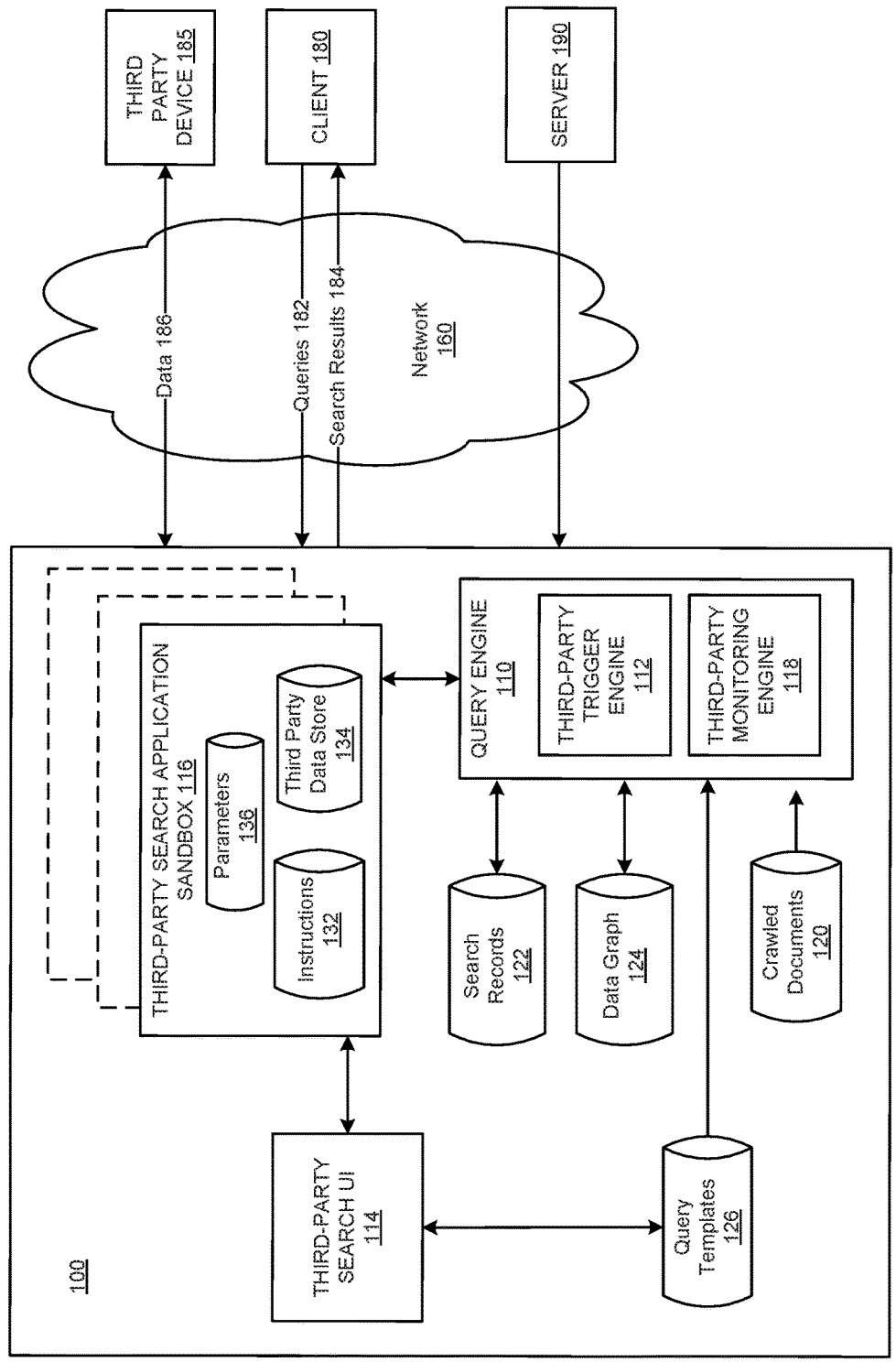
FIG. 1 illustrates an example system in accordance with some implementations.

FIG. 1 is a block diagram of a system 100 in accordance with an example implementation. The system 100 may be used to implement a search engine that includes third party search applications that provide natural language answers to specific queries. The depiction of system 100 in FIG. 1 is described as a system capable of searching sources available over the Internet as well as data provided by third parties not conventionally available to a search engine. The system may provide an interface that guides third parties through the process of creating a search application, a sandbox in which the third party search applications execute in response to targeted queries, and a query engine that initiates third party search applications in response to appropriate queries. Other configurations and applications of the described technology may be used. For example, the system may include search results from one or more corpora, such as intranets, libraries, or other document repositories.

Figure 8:
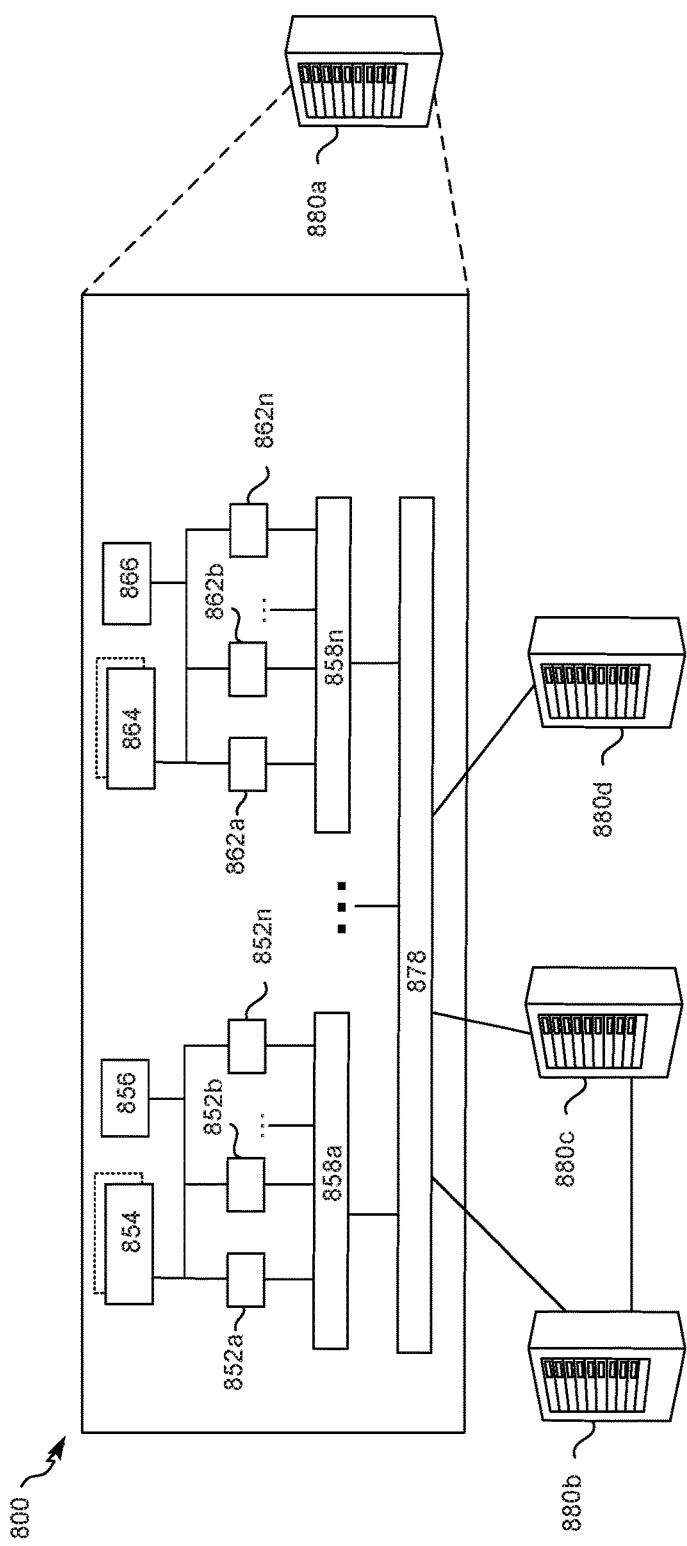
FIG. 8 shows an example of a distributed computer device that can be used to implement the described techniques.

The search system 100 may receive queries 182 from a client device 180 and return search results 184 in response to the queries. Each query 182 is a request for information. Query 182 can be, for example, text, audio, images, or scroll commands. The system 100 may include query engine 110, third-party search user interface (UI) 114, and one or more third-party search applications 116. System 100 may be a computing device that takes the form of a number of different devices, for example a standard server, a group of such servers, or a rack server system. In some implementations, third-party search applications 116, third-party search UI 114, and query engine 110 may each be a separate computing device, or they may share components such as processors and memories. For example, the third-party search UI 114 and the query engine 110 may be implemented in a personal computer, for example a laptop computer. In some implementations, the third-party search UI 114 and the query engine 110 may be distributed systems implemented in a series of computing devices, such as a group of servers. The system 100 may be an example of computer device 800, as depicted in FIG. 8.

The search system 100 may include a query engine 110. The query engine 110 may search crawled documents 120, data graph 124, or other corpora in responding to a search request, such as query 182. For example, the query engine 110 may be capable of searching crawled documents 120 in addition to the data graph 124, and/or some other index. Crawled documents 120 may include an index for searching for terms or phrases within a corpus of documents. In some implementations the corpus may be documents available on the Internet. Documents in crawled documents 120 may include any type of file that stores content, such as sound files, video files, text documents, source code, news articles, blogs, web pages, PDF documents, spreadsheets, etc. In some implementations, crawled documents 120 may store one-dimensional posting lists that include phrases, terms, or document properties as posting list values and, for each posting list value, identifiers for documents related to the phrase or term. The posting lists may also include additional information. While an index for crawled documents 120 has been described as using posting lists, the index may have some other known or later developed format.

The system 100 may also include other searchable corpora, such as data graph 124. A graph-based data store, such as data graph 124, is a data graph that stores information in the form of nodes and edges, with nodes being connected by edges. A node in a data graph may represent an entity, such as a person, place, item, idea, topic, abstract concept, concrete element, other suitable thing, or any combination of these. Entities in the graph may be related to each other by edges, which may represent relationships between entities. For example, the data graph may have an entity that corresponds to George Washington and the data graph may have a has profession relationship between the George Washington entity and a U.S. President entity and a Military General entity. An indexing engine may maintain the graph-based data store 124 to allow the query engine 110 to search the data graph, for example finding entities, finding entities related to other entities by one or more relationships or paths in the graph, etc. The graph-based data store 124 may include an index or some other method for searching for and retrieving data from the data store. In some implementations, some of the entities in the data graph may have attributes that facilitate locating the entity through a text-based search. In some implementations, special entities may facilitate the text-based search.

The query engine 110 may also be capable of initiating one or more third party search applications 116, each in its own sandbox. A third party is any party that does not control or direct the search system. For example, a third party may be a web site owner. To initiate a third party search application, the query engine 110 may correlate a query 182 to one or more query templates 126. A query template 126 may be a regular expression or other template associated with a third party search application against which a query 182 is evaluated. If the query engine 110 finds the query 182 correlates to a particular query template 126, the query engine may invoke the third party search application that is associated with the particular query template 126.

A third party search application 116 may be stored in a sandboxed environment. A sandboxed environment limits the resources the application has access to and/or the functions it can perform. A third party search application 116 may include one or more query templates 126, one or more parameters 136 derived from the query or the context of the query, and instructions 132 for generating a query answer from the parameter. For example, the instructions 132 may be a calculation performed on the parameter 136, the result of the calculation being the query answer. The instructions may also include a format for the query answer. For example, the instructions may indicate the parameter is a temperature to be converted from Fahrenheit to Celsius, and the instructions may provide the query answer in a sentence, such as "$1 Fahrenheit is equivalent to $2 Celsius" with the variable $1 replaced by the query parameter and $2 being the result of the calculation performed on the query parameter. In some implementations, the instructions 132 may be default instructions provided by the search system. Some third-party search applications may also include a data store 134 provided by the third party. The data store 134 may be in a spreadsheet format, a data base format, a delimited-file format, an Extensible Markup Language (XML) file, or any other format that allows a particular piece of data in the data store to be identified and accessed. If a data store 134 is provided, the instructions 132 may include instructions for accessing the data store 134 using the parameter in addition to other data manipulation instructions and query answer formatting. The data store 134 may be uploaded, for example from the third party site, a third party device 185 or the data may be stored at memory shared with the search system.

The third party may interact with the search system 100 via the third party search UI 114. The third party search UI 114 may include one or more computing devices that include one or more processors configured to execute machine executable instructions or pieces of software, firmware, or a combination thereof. The third-party search UI 114 may share a computing device or devices with the query engine 110, or may operate using one or more separate computing devices. The third party search UI 114 may facilitate creation of query templates 126 or triggers, parameter 136 definitions, uploading and defining data store 134, and creating instructions 132. In some implementations, the third party may not be able to provide the instructions, but may be able to select from a predefined set of instructions provided by the operator of the search system 100. In some implementations the third party may provide computer code as instructions 132. In some implementations the functions used in the computer code may be limited. In some implementations an operator of the search system 100 may optionally review the code provided by a third party.

FIG. 2 illustrates an example of a user interface 200 generated by the third party search UI 114. The user interface 200 may enable a third party to determine what types of queries 182 trigger, or initiate, the search application. Of course, the search system 100 may authenticate the third party prior to presenting user interface 200, using any known or later developed authentication techniques, to ensure that the third party search application cannot be accessed and modified by unauthorized parties. The user interface 200 may include an identifier 205 for the third party search application that differentiates it from other third party search applications. The user interface 200 may also include a site identifier 210. The site identifier 210 may be used to identify the source of the query answer to the query requester at query time. The site identifier 210 may be a website associated with or operated by the third party. The site identifier 210 may also act as a quality assurance measure that ensures that the third party search application provides high quality answers. For example, in some implementations after the third party creates the search application, the search system 100 may run a test query that matches the provided query template to determine if the site identifier 210 appears in query answers generated from a corpus of indexed documents in response to the query. If no answer is associated with the site identifier 210, or if a ranking signal of an answer associated with the site identifier 210 does not meet a signal threshold, the search system 100 may deactivate the third party search application. In some implementations the search system may also perform this check after queries are submitted prior to triggering the third party search application at query time to ensure the quality of the answers provided by the third party search application is maintained.

The user interface 200 may also include a query template 215, or query trigger. The query template may be a regular expression with one or more variable portions 217 that correspond to a parameter value supplied by the query. The variable portion 217 may represent or correspond to one or more words or terms from the query. A regular expression is a sequence of text characters used to identify textual material of a given pattern. For example, a regular expression of "how far is $dest" may match or correspond to a query of "how far is New York," "how far is Sydney," or "How far is Washington D.C." but may not match "how far can a bird fly." The third party may associate several triggers 215 with the same search application. For example, each trigger may represent a different way of asking the same question, as illustrated in FIG. 2. In some implementations, the search system may suggest a query template to the third party. For example, the search system may use search records 122 to determine past query answers that include the site identifier 210, determine whether there is a pattern to the queries that elicited the answers, and offer the pattern, if one exists, as a potential trigger. The query templates may reflect natural language queries that a query requester may use. A natural language query is a query in the format a person would use to ask a question in a conversation with another person and can include context, rather than focusing on keywords.

The user interface 200 may also include a manner of defining parameters and their attributes. Parameters may come from a context of the query or from the query itself. The context of a query may include a location for the query, a date/time for the query, a browser or operating system used by the query requester, etc. The third party may select one or more of these parameters for use in determining a query answer. For example, the user interface 200 may include a selection icon 220 that, when selected or chosen, indicates the third party desires to use query context parameters. Of course, other selection methods such as a drop-down list, a plurality of radio buttons, or some other selection method may be used. For parameters coming from the query, the user interface 200 may allow the third party to enter parameter attributes, such as name and type. Accordingly, the user interface 200 may include a parameter name 225 attribute and a parameter type 230 attribute. The parameter name 225 corresponds to a variable portion of the query template 215. Preferably the third party provides a name 225 and type 230 for each variable portion 217 in the query template. The name 225 and type 230 may define the parameter so that it can be used and referred to in the instruction portion of the third party search application. In some implementations the parameter name 225 matches a corresponding variable portion in the query template 215. For example, the variable portion 217 is "$destination," which matches the name 225 of "destination." Parameters may have a type 230 of a string, a number, or an entity.

An entity parameter is a parameter that corresponds with, for example, an entity in a data graph, such as data graph 124 of FIG. 1. When the third party selects a parameter with an entity type the user interface 200 may offer a parameter attribute that allows the third party to specify what type of entity the parameter corresponds to. For example, the user interface 200 may allow the third party to specify that the entity is a person, a place, an event, a movie, etc. However, because the third party application is sandboxed, the third party application cannot access the data graph directly. Accordingly, the search system may provide a function or process that allows the third party search application to request an entity identifier that corresponds to a particular parameter. The returned identifier may be used as a key into the data store. This works in particular when the data graph is based on a public source, such as the Freebase data graph available at www.Freebase.com.

The user interface 200 may also allow the third party to provide one or more data stores. Data stores, also referred to as data tables, may be spreadsheets, delimited lists, XML, files, or some other format. In some implementations the third party may upload the data store to the search system 100. In some implementations, the third party may store the data store in a shared location, such as a cloud-based server. In some implementations, the data store may be a spreadsheet published to the Internet so that the search system can access the data table. Regardless, the third party may supply a type 240 attribute for the data store, a source location 245 attribute for the data store, and a name 250 attribute for the data store. The type 240 may be an indication of the format, e.g. spreadsheet, delimited, XML, etc., of the data store. The name 250 may be an identifier used in the instructions to identify and refer to the data store. The source 245 may indicate a location for the data store for import or update purposes Additional attributes may also be included in user interface 200 that further define the data store, such as the key or keys 255 used to access the data store.

In some implementations the structure of the data store may be derived from the data store itself. For example, the data store may include a first row or first record with the name of each column. Thus, the first row may provide the column names for the data table. In some implementations, the first column of the data table may be a unique key for the data table. The third party search application may assume that a header row exists and the first column contains the key and use this information to dynamically define the data. Of course, other methods, now known or later discovered, of defining the layout of the data table may be used. For example, the data table may be an XML file with an XML Schema Definition (XSD) file. In some implementations, the third party may provide more than one data table. The user interface may provide a verification process that the search system can use to access and read the data table. For example, the CHECK link 260 of user interface 200 may provide such a process. In some implementations, the data table may be optional.

The user interface 200 may also provide a way for the third party to supply instructions for handling the parameters, accessing the data store, manipulating data, and providing a query response. For example, the third party search application may provide code box 265 where the third party may supply instructions for using the parameter and, optionally, the data table to generate a query result. The instructions may be provided in a computer language. The language used by the search system can be any known or later developed language used to program computers, for example, a general language such as Python, C++, Java, JavaScript, etc. or a language targeted to database manipulations such as SQL, KQL, etc. In some implementations, the code may be provided by the third party and in some implementations, the code may be provided by an operator of the search system. In some implementations, the search system may apply restrictions on certain functions to enforce low latency and/or tight security constraints.

In some implementations, the code may be optional and the search system may execute a default set of instructions on the data table. In implementations where the data table is optional, the instructions may execute a calculation performed on the parameters to provide an answer to the query that matched the template or may assume that a second column of the data table provides the answer when a first column matches a parameter provided by the query. The instructions may include an instruction 270 that indicates how the query answer is formatted. The instruction 270 may also be a default format provided by the search system. In some implementations the instruction 270 may include a deep link to the website, e.g., the site 210, of the third party. The link may take into account the parameters extracted from the query and the query context, allowing the query requester to navigate to a page not conventionally available without the third party site collecting additional information from the requester. Of course, the third party search application may include additional elements not illustrated in user interface 200.

Returning to FIG. 1, the system 100 may also include search records 122. Search records 122 may include search logs, aggregated data gathered from queries, or other data regarding the search terms and search results of previously processed queries. Certain data in the search records 122 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. In some implementations, the search records 122 may be generated by query engine 110 in the normal process of generating search results 184.

The query engine 110 may include one or more computing devices that use data graph 124, third party search applications 116, and/or crawled documents 120 to determine search results 184 for queries 182. Search results from crawled documents 120 may be determined, for example, using conventional or other information retrieval techniques and represent conventional snippet-based results generated from crawled documents 120. Search results generated by one or more third party search applications 116 represent natural language results, e.g., answers formatted by the third party. Query engine 110 may include one or more servers that receive queries 182 from a requester, such as client 180, and provide search results 184 to the requester. Search results 184 may include snippet information from documents responsive to the query and one or more answers provided by the third party search applications 116. The query engine 110 may include a third party trigger engine 112 that determines whether a query triggers third party search applications 116. The query engine 110 may include a ranking engine that identifies documents responsive to the query from crawled documents 120 and calculates scores for the documents and third-party formatted answers responsive to the query, for example, using one or more ranking signals. The ranking engine may rank the documents and answers found responsive to the query using the scores. In some implementations, the third-party formatted answers may be ranked ahead of other types of answers. In some implementations, the third party search application may have an associated quality score that the ranking engine uses to determine where the answer falls within the responses to the query.

Figure 3:
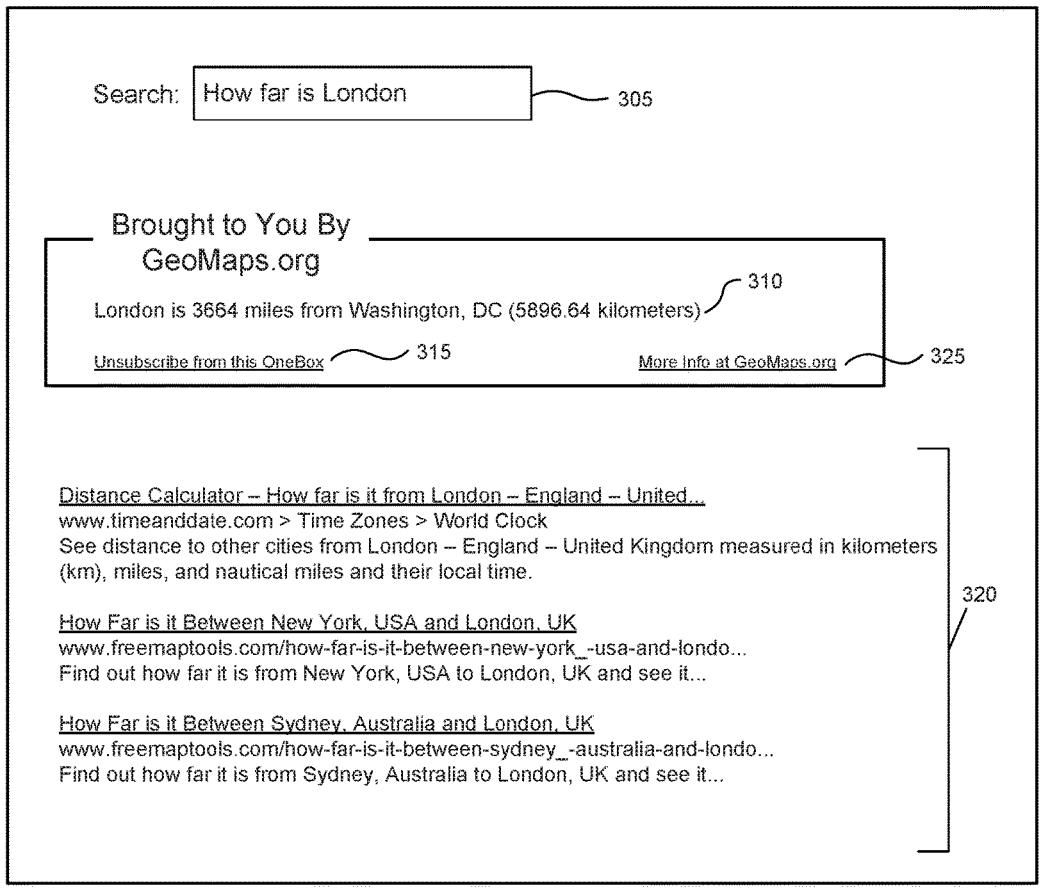
FIG. 3 illustrates an example of a user interface displaying a query answer generated by a third party search application, consistent with disclosed implementations.

FIG. 3 illustrates an example of a user interface 300 displaying a query answer generated by a third party search application, consistent with disclosed implementations. The query engine 110 may generate information used to produce user interface 300 in response to the query 305 of "How far is London." For example, the third party trigger engine 112 may evaluate the received query against the query templates 126. If the query corresponds to one of the query templates 126, the third party trigger engine 112 may cause the third party search application 116 that corresponds with the query template to execute. The third party search application 116 may generate a query answer and provide the answer to the query engine 110 for inclusion in the query result. For example, when the query requester submits query 305 the query engine 110 may search indexed documents for documents responsive to the query using any known or later developed techniques. Information from some of the responsive documents may be returned as snippet-based search answers 320. In addition, the third party trigger engine 112 may evaluate the query 305 against query templates 126. A query template of, for example, "how far is $destination" may correspond with the query 305. When a query template corresponds with the query, the third party trigger engine 112 may cause the third party search application 116 associated with the query template to execute. The third party search application 116 may use the variable or parameter portion, in this example "London" to generate an answer 310 to the query 305. In the example of user interface 300 the third-party formatted answer 310 may be presented in a position of prominence with respect to the snippet-based answers 320. In some implementations the answer may include a deep link 325. The deep link may include parameter information used to generate the answer 310.

In some implementations, user interface 300 also includes an avenue for the query requester to provide feedback regarding the answer 310. For example, the user interface 300 can include a link 315 that allows the query requester to indicate displeasure with the provided response. The query engine 110 may include a third party monitoring engine 118 that tracks displeasure with the provided answer 310. If a predetermined quantity of query requesters indicate displeasure with the answer 310, the search system 100 may disable or take down the third party search application that provided the response In some implementations, the third party monitoring engine 118 may also track, for each third party search application 116, a quantity of times query requesters select a snippet-based response without choosing the answer provided and formatted by the third party search application. If this quantity for a particular third party search application meets a threshold the search system 100 may disable the particular third party search application. In addition, the third party monitoring engine 118 may monitor the third party search applications 116 as they execute. If a specific third party search application 116 requests too many resources the system 100 may shut down or restrict the specific third party search application 116.

Returning to FIG. 1 data graph 124, crawled documents 120, query templates 126, third party search applications 116, and search records 122 are stored on tangible computer-readable storage devices, for instance disk, flash, cache memory, main memory, or a combination of these, configured to store data in a semi-permanent or non-transient form. In some implementations data graph 124, crawled documents 120, query templates 126, third party search applications 116, and search records 122 may be stored in a combination of various memories.

In some implementations, the system 100 may include an indexing engine (not shown) that includes one or more processors configured to execute one or more machine executable instructions or pieces of software, firmware, or a combination thereof to create and maintain crawled documents 120 and/or data graph 124, etc. The indexing engine may obtain content from, for example, one or more servers 190, and use the content to maintain crawled documents 120 and/or data graph 124. In some implementations, the servers 190 may be web servers, servers on a private network, or other document sources that are accessible by the indexing engine.

The search system 100 may be in communication with the client(s) 180, third party devices 185, and/or servers 190 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the query engine 110 may communicate with and transmit data to/from clients 180 and/or third party devices 185. For example, query engine 110 may transmit search results or suggested updates to one or more of clients 180 and may receive query templates or data tables from third party device 185. Clients 180 and third party device 185 may represent computing devices, such as device 700 or 750 of FIG. 7. A human user may use third party device 185 to communicate with and provide information and data 186 to the search system 100.

Figure 4:
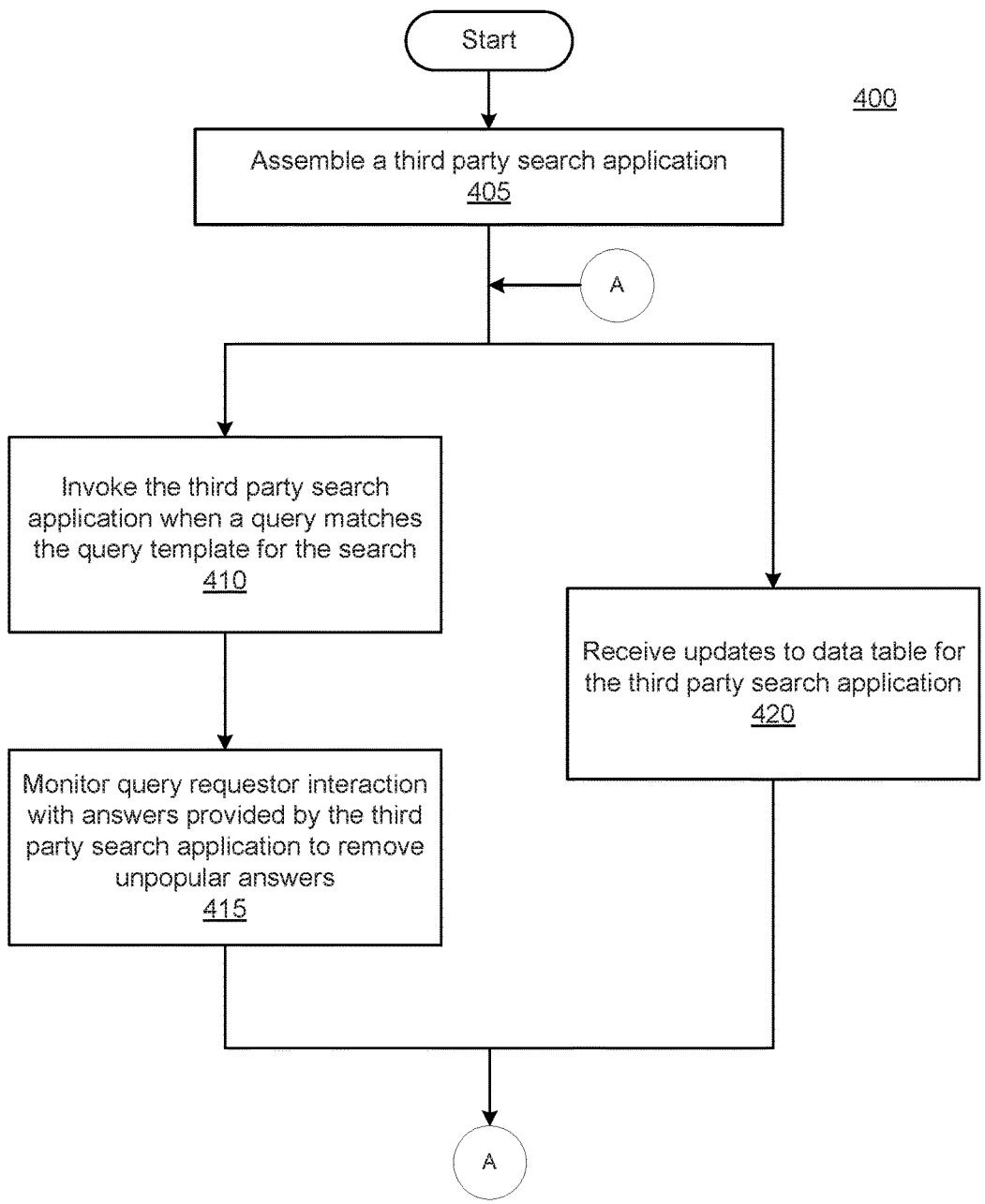
FIG. 4 illustrates a flow diagram of an example process 400 for providing search results enhanced with answers from third party search applications, consistent with disclosed implementations.

FIG. 4 illustrates a flow diagram of an example process 400 for providing search results enhanced with third party search applications, consistent with disclosed implementations. A search system, such as search system 100 of FIG. 1, may perform process 400 to set up, use, and monitor search system hosted third party search applications. It is understood that some of the steps illustrated in FIG. 4 may be optional, and implementations need not perform each step, or may perform the steps in a different order.

Process 400 may begin with the search system obtaining and assembling a third party search application (405). A third party search application includes a query template, a parameter, instructions for generating a query answer using the parameter, and optionally a data table. In some implementations the third party search application may also include a URL of a site associated with the third party. The search system may identify a third party search application through a name provided by the third party, through the URL, through an identifier assigned by the search system, or a combination of these. A third party may identify or supply at least some of the elements to the search system and the search system may associate them with an identifier and store them as a third party search application.

Figure 5:
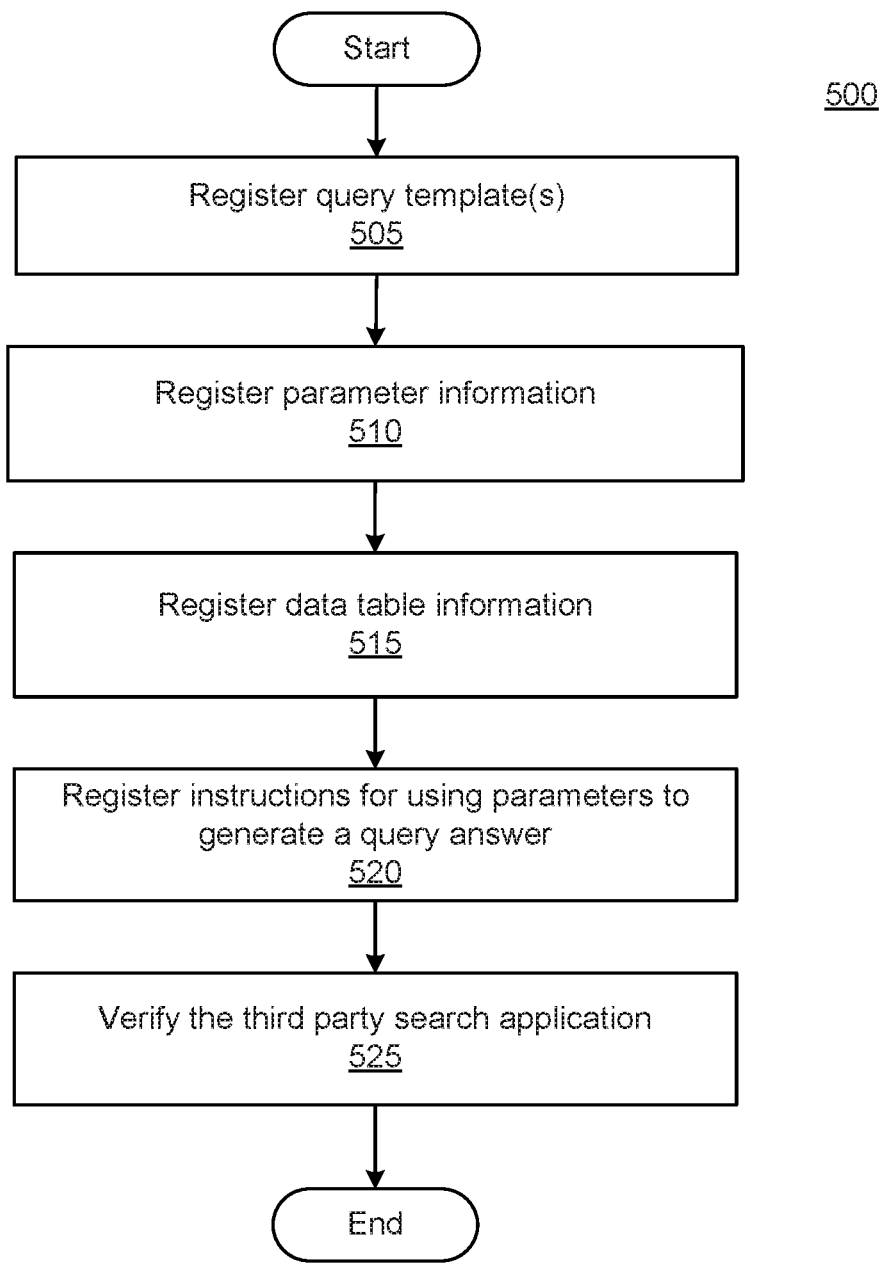
FIG. 5 illustrates a flow diagram of an example process for assembling a third party search application, consistent with disclosed implementations.

FIG. 5 illustrates a flow diagram of an example process 500 for assembling a third party search application, consistent with disclosed implementations. A search system, such as search system 100 of FIG. 1, may perform process 500 as part of step 405 of FIG. 4. Process 500 may begin with the search system registering one or more query templates identified by a third party (505). As explained above, a query template may be an indication of which queries the third party search application provides answers to. The query template may be a regular expression with a fixed portion and a variable portion. For example, the query template "$name bacon number" may have a variable portion represented by $name, which can match any number of characters or words that precede the fixed portion of "bacon number". For example, the query template above corresponds with "Richard Gere bacon number," "Twiggy bacon number," and "Sarah Michelle Gellar bacon number." The variable portion may correspond to a parameter. In some implementations, the query template may not include a variable portion. For example, the query template of "what time is it" has no variable portion. The third party may supply the query templates using, for example, user interface 200 illustrated in FIG. 2. The search system may register the query template by associating the query template with the third party search application and storing the query template at the search system in a memory accessible by the query engine so that the search system may evaluate the query template against a query at query time.

The search system may register information for one or more parameters identified by the third party for the third party search application (510). The information may include a source for the parameter value. The parameter values may come from a query context or from the query itself. For example, the third party may indicate that query context parameters are to be included in the third party search application. Such parameters include location (e.g. city, state, country) of the query requester, date and time of the query, browser or operating system used by the query requester, etc. The information may also include a name and type for parameters with values derived from the query. For example, a parameter of $name may be identified by the third party, and the value of the $name parameter may be taken from the query at query time. As explained above with regard to FIG. 2, parameters may be strings, numbers, or entities. Entity parameters may also include additional information, such as a data graph that includes the entity or some other file used to locate or determine an entity identifier for the parameter obtained from the query. The third party may identify one or more parameters and the search system may register the parameters by associating the parameters with an identifier for the third party search application and storing the parameters at the search system.

To assemble the third party search application, the search system may also register one or more data tables (515). The data tables can be spreadsheets that include data used to generate a query answer. The data tables can also be delimited text files, XML files, or any other method of providing data from the third party to the search system. In a spreadsheet or delimited text file, a first row of the data table may be used to define the columns. Alternatively, the search system may obtain column definitions from the third party as part of the registration process, for example using a user interface that collects this information. The third party may provide the information about the data table via a user interface, such as user interface 200 of FIG. 2. The search system may register the data table by associating the data table with an identifier for the third party search application and storing the data table at the search system. In some implementations, the data table may be stored in memory accessible by the search system.

To assemble the third party search application, the search system may also register instructions for using the parameters to generate a query answer (520). The instructions may include a calculation performed using the parameters, instructions for accessing the data tables, and instructions for formatting the query answer. In some implementations, the third party may supply the instructions via a user interface, such as user interface 200 of FIG. 2. In some implementations the search system may limit the types of instructions available to the third party. For example, the third party may be limited to string and numeric operations performed on the parameters or columns of the data table. In some implementations the search system may provide functions that enable a third party search application to obtain data from another data source, such as data graph 124. In some implementations, the instructions supplied by the third party may be verified by an operator of the search system before the third party search application is made available to the query engine.

In some implementations, the instructions may be default instructions provided by the search system. For example, the instructions may be instructions that assume a passed-in parameter is a key value, match the parameter to the first column of the indicated data table and generate an answer that includes the query and a value from a second column in the data table. The answer may be in the format of <query> is <2nd column>. For example, the third party search application may include a query template of "mac keyboard shortcut for $cmd," a data table that has the values of $cmd in a first column and the corresponding shortcuts in a second column. For such a third party search application, a query of "mac keyboard shortcut for force quit" may cause the third party search application to generate an answer of "mac keyboard shortcut for force quit is command-option-esc."

The instructions may also include instructions for formatting the query answer provided by the third party search application. The query answer may be a natural language query answer that directly answers the query. The answer may include a sentence, paragraph, or string, a list of items, or a dictionary that includes the natural language answer, a deep link to show with the answer, and anchor text for the deep link. The answer may include text representing the parameter values used to generate the answer. In some implementations, the deep link may include parameters extracted from the query or query context. The deep link may resolve to a page in the website of the third party not conventionally available without data collection by the third party. The search system may register the instructions by associating the instructions with an identifier for the third party search application and storing the instructions at the search system.

In some implementations, the search system may verify the third party search application prior to making the third party search application available for use in generating a query response (525). For example, the search system may generate a search result for a query that corresponds to the query template associated with the third party search application. If a site or URL associated with the third party search application does not meet a ranking threshold within the search result, the search system may disable the third party search application or may not make the third party search application available to the query engine. For example, the search system may disable the query templates so that the query engine never invokes the third party search application.

As another example, the search system may execute the third party search application in a sandboxed environment to determine what resources the third party search application consumes. In a sandboxed environment the search system tightly controls which resources the third party search application has access to. For example, the search system may ensure that the third party application only has access to the parameter information, data tables associated with the third party search application, and specific functions. Even while executing in the sandboxed environment, if the third party search application consumes too many resources the search system may disable the third party search application. As another example, if the third party search application takes too long, i.e. does not provide a query answer within a predetermined amount of time, the search system may disable the third party search application. Verifying the third party search application can include these and other measures to ensure that the third party search application provides high-quality answers without impacting the search system or the user experience. In some implementations the verification may be performed each time a change is made by the third party to the third party search application. Process 500 then ends having assembled and verified the third party search application.

Returning to FIG. 4, with at least one third party search application in place, the search system may then invoke the third party search application in response to a query submitted by a query requester (410). The invoked third party search application may or may not provide a third-party formatted query answer for the query, depending on the parameter supplied and the values in the third party data store. The search system may also invoke more than one third party search application when a query triggers more than one query template. The search system may include the third-party formatted answer in a search result provided to the query requester, as discussed above with regard to FIG. 3.

Figure 6:
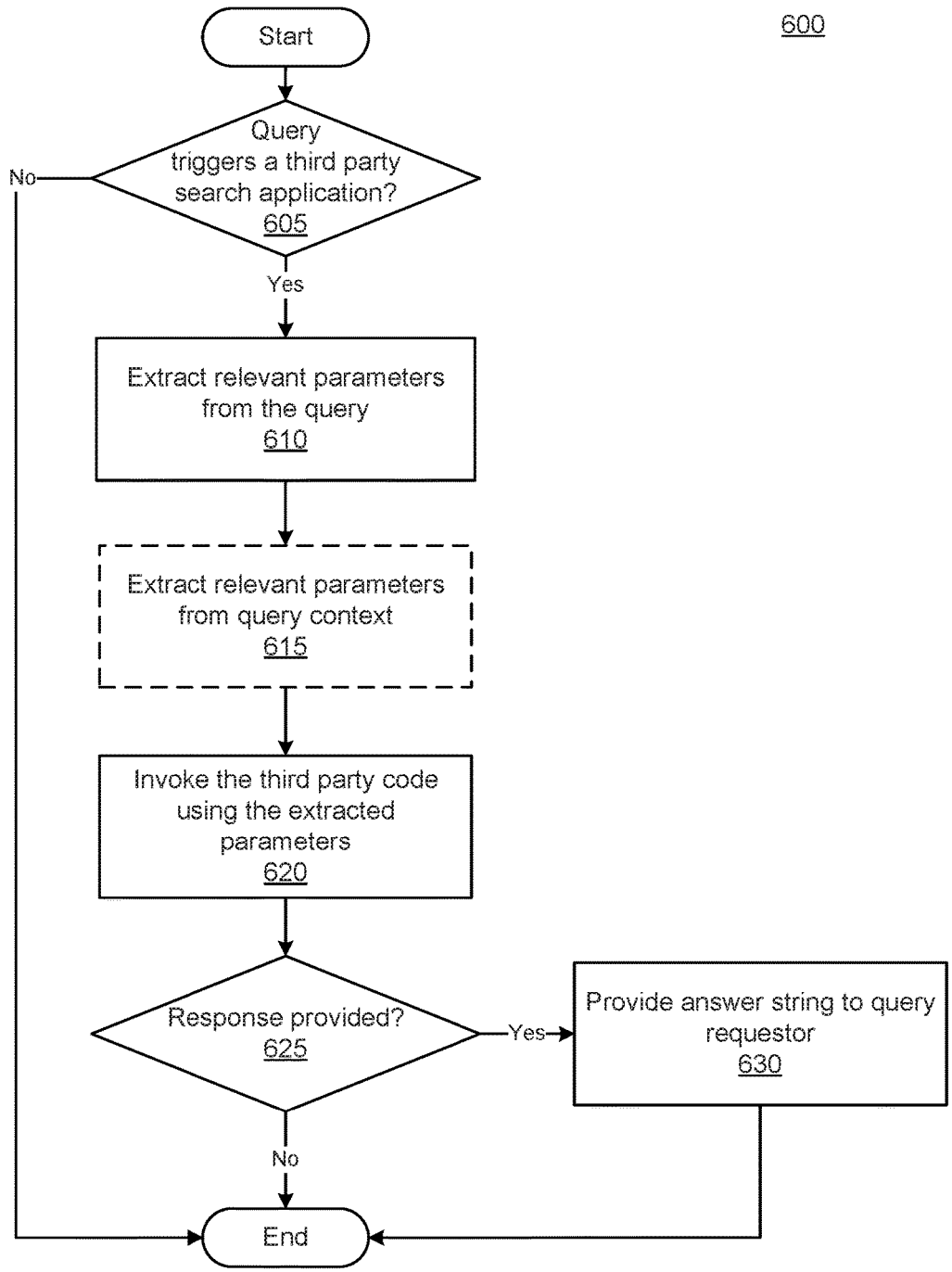
FIG. 6 illustrates a flow diagram of an example process for using a third party search application to provide a query answer at query time, consistent with disclosed implementations.

FIG. 6 illustrates a flow diagram of an example process 600 for using a third party search application to provide a query answer at query time, consistent with disclosed implementations. A search system, such as search system 100 of FIG. 1, may perform process 600 as part of step 410 of FIG. 4. For example, the search system may receive a query from a query requester and may perform process 600 in addition to, or instead of, a process that searches indexed documents and generates snippet-based search results for the query. Process 600 may begin by determining whether the query triggers a third party search application (605). To determine whether a query triggers a third party search application, the search system may evaluate the query against query templates for the third party search application. For example, the search system may determine whether a first portion the query matches the non-variable portion of the query template, with a second portion corresponding to a variable portion of the query template, if any. In some implementations, if the query matches or corresponds to the non-variable portion of the query template the query may trigger the third party search application. As another example, the search system may include natural language processing and sentiment analysis on the query, taking into account the context of prior queries to determine whether the query triggers a third party search application. For example, if a prior query for the requester was "what is the weather in New York" and the current query is "How far is it from there to London", the search system may use the prior query to determine what city to use for the pronoun "there" and substitute "New York" for "there" in the query prior to determining whether the query corresponds to the query templates. As another example, if the query is "movie times tomorrow" the search system may substitute a date for "tomorrow" in the query.

In some implementations, the search system may optionally perform an additional check prior to triggering the third party search application. For example, the search system may verify that a site associated with the third party search application appears in a search result generated from a search of indexed documents in response to the query. This may ensure that the third party search application closely relates to the subject matter of the query. In some implementations this may only be performed if a ranking signal for the site or for the third party search application is below a threshold. If the site does appear in the search result, the query triggers the third party search application. In some such implementations, the query does not trigger the third party search application unless the site has a minimum rank signal within the search result.

If the query does not trigger the third party search application (605, No), process 600 ends without providing a third-party formatted query answer. But if the query does trigger the third party search application (605, Yes), the search system may extract relevant parameters from the query (610). The parameters may be extracted using the variable portion of the query template. For example, the second portion of the query that corresponds to the variable portion of the query template may be extracted and used as the value of the parameter identified in the variable portion of the query template. The search system may also extract relevant parameters from the context of the query (615). These parameters may be extracted if the third party indicates the desire to use these parameters in the third party search application, as discussed above with regard to item 220 of FIG. 2. The search system may then invoke the third party search system and pass any extracted parameters to the third party search application (620). The search system may execute the third party search application in a sandboxed environment to limit the resources available to the third party search application and to ensure that the third party search application does not adversely impact the search system. The third party search application is hosted and executed at the search system, making communication with a server or site hosted by the third party unnecessary. This decreases query latency and allows the search system to more tightly control the actions performed by the third party search application.

The search system may determine whether the third party search application provides a response (625). For example, the third party search application may return a blank or NULL string, indicating no answer was generated. Also, if the third party search application fails to provide an answer within a time limit the search system may not wait and may determine no answer will be provided. If the third party search application provides a response (625, Yes), the search system may provide the answer as part of a search result for the query requester (630). As discussed above, the answer is a natural language answer formatted and provided by the third party search application.

If the search system determines that the third party search application did not provide an answer (625, No), process 600 ends and no third-party formatted query answer is added to the search result. Of course, the search system may repeat process 600 for multiple third party search applications simultaneously or serially. In other words, the search system may provide more than one third-party formatted query answer from multiple third party search applications if the query triggers more than one third party search application. The various third party search applications may be invoked at the same time, one after another, or some combination of these.

Returning to FIG. 4, in some implementations the search system may also monitor query requester interaction with answers provided by third party search applications to remove unpopular answers or low quality answers (415). For example, the search system may determine whether a query requester selects responses in positions of lower prominence than the answer provided by the third party search application. The search system may track the number of times this occurs and may decrease the rank of the answers provided by the third party search application, decrease the rank of the site associated with the third party search application, disable third party search application, or a combination of these if the number of times meets a threshold. In some implementations the search system may provide a link or other control with the answer provided by the third party search application that allows the query requester to indicate disapproval of the answer. The search system may track the number of times unique query requesters select this link or control. If the number of unique requesters that select the link or control for the third party application meets a threshold the search system may disable the third party search application or decrease the rank of the answer or the site associated with the third party search application. Thus, if a third party provides a third party search application with low quality answers, the search system may choose to penalize the third party by reducing the rank of the site associated with the third party search application in search results generated from a corpus of indexed documents.

Concurrently with and independently from invoking the third party search applications at query time, the search system may also receive updates to a data table (420). The search system may provide an avenue for the third party to update the data table as often as the third party desires, for example using a feed or an ongoing update protocol such as pubsubhubbub. This ensures that the data used to generate a natural language answer is fresh without placing the burden of checking for updates on the search system.

Additionally, the search system may allow the third party to update query templates, parameters, and instructions for their third party search applications. Process 400 may continue to perform steps 410-420 as the search system responds to queries. Of course, the search system may assemble many third party search applications from various third parties as part of step 405. In some implementations, the search system may assemble tens of thousands of such applications, providing the opportunity for tens of thousands of third parties to generate natural language answers in response to targeted queries.

While discussed above with regard to providing enhanced search results for a document-based corpus, third party search applications may also be useful in other collections, such as image or video searches, map searches, social media searches, etc. The foregoing discussion is accordingly one example and not meant to be limiting.

Figure 7:
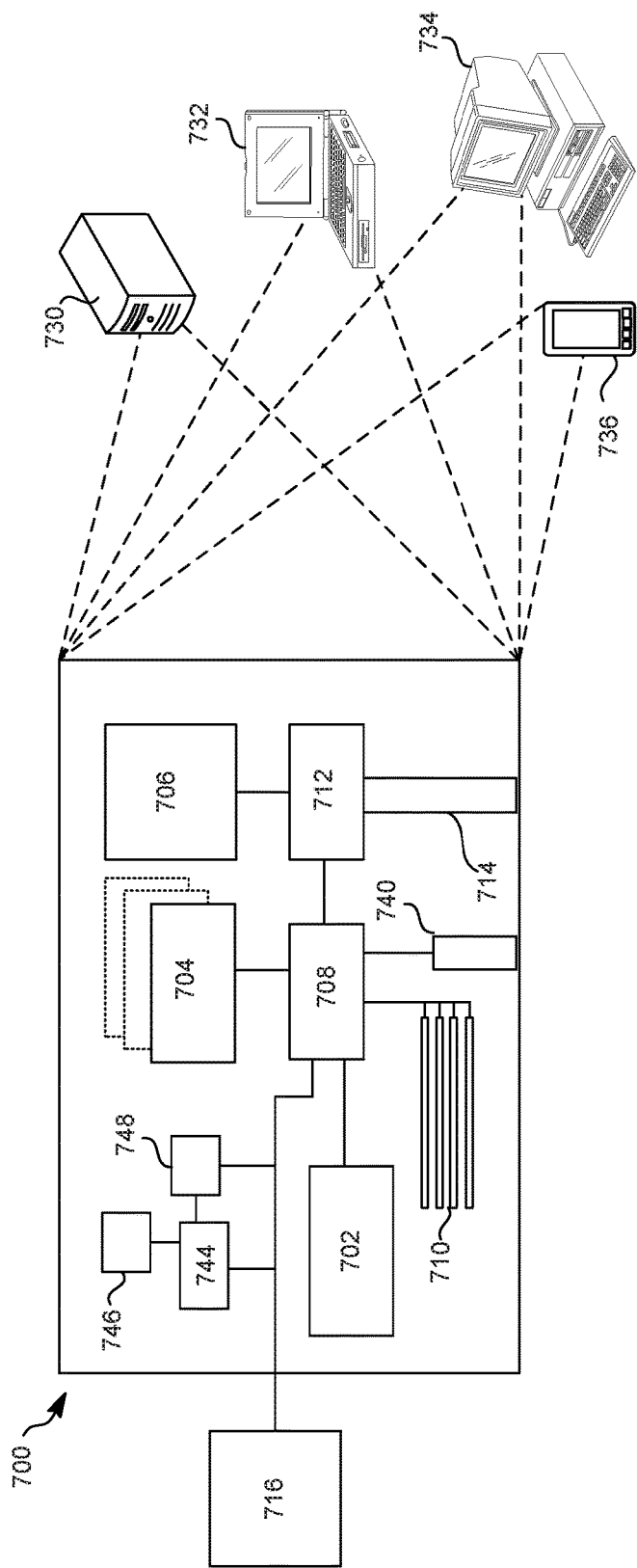
FIG. 7 shows an example of a computer device that can be used to implement the described techniques.

FIG. 7 shows an example of a generic computer device 700, which may be system 100, third party device 185, and/or client 180 of FIG. 1, which may be used with the techniques described here. Computing device 700 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a personal computer such as a laptop computer 722, or smart phone 736. An entire system may be made up of multiple computing devices 700 communicating with each other. Other configurations are possible.

FIG. 8 shows an example of a generic computer device 800, which may be system 100 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, which are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800 as query engine 110, third party search UI 114, and third party search application 116. Furthermore, some of the computing devices may be located geographically close to each other, and others may be located geographically distant. The layout of system 800 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving a query at a search system;

determining, using at least one processor, that the query corresponds to a query template, the query template being provided by a third-party, the query template being a regular expression;

generating, using the at least one processor of the search system, a third-party formatted natural language answer for the query by executing computer-language instructions obtained from the third party for generating the natural language answer and for formatting the natural language answer; and providing the third-party formatted natural language answer as a search result for the query, wherein the query template and the computer-language instructions are stored at the search system as a third-party search application, which generates the third-party formatted natural language answer without communicating with a third-party site.

2. The method of claim 1, wherein the third-party search application includes a data store received from the third party and stored at the search system and the computer-language instructions include instructions for accessing the data store and for using information obtained from the data store to generate the third-party formatted natural language answer.

3. The method of claim 2, wherein the third-party search application generates the third-party formatted natural language answer by:

locating a record in the data store; and using a field from the record to replace a variable in the third-party formatted natural language answer.

4. The method of claim 2, further comprising:

receiving updated data for the data store from the third party on a periodic basis; and updating the data store with the updated data.

5. The method of claim 2, further comprising:

obtaining a parameter value from a query context of the query, wherein the third-party search application uses the parameter value to locate a record in the data store.

6. The method of claim 2, the regular expression including a variable portion and the method further comprises: extracting, from the query, a parameter value that corresponds to the portion of the query that matches the variable portion, wherein the parameter value is used in accessing the data store.

7. The method of claim 1, further comprising:

obtaining a parameter value from a query context of the query, wherein the third-party formatted natural language answer includes the parameter value.

8. The method of claim 1, wherein the regular expression includes a variable portion and the method further comprises:

extracting a parameter value from the query that corresponds to the portion of the query that matches the variable portion.

9. The method of claim 8, wherein the third-party formatted natural language answer includes a sentence determined by the third party that includes the parameter value.

10. The method of claim 1, wherein the query is an audio query.

11. A search system comprising:

at least one processor; and memory storing instructions that, when executed by the at least one processor, cause the search system to perform operations comprising:

receiving at least one query template from a third party, the at least one query template comprising a regular expression, receiving a data store from the third party, the data store including attributes and data, receiving, from the third party, computer-language instructions for accessing the data store and for formatting a natural-language query answer that includes data identified by accessing the data store, and storing the data for data store, including the data and the attributes, and the at least one query template at the search system as a third-party search application, wherein the search system executes the third-party search application, which generates and provides the natural-language query answer responsive to a query matching the at least one query template, without communicating with a third-party site.

12. The search system of claim 11, wherein the receiving and storing are repeated for a plurality of distinct third parties.

13. The search system of claim 11, wherein the memory further stores instructions that, when executed by the at least one processor, cause the search system to perform operations comprising:

determining that the query corresponds to the query template;

generating a natural-language query answer for the query by executing the instructions for accessing the data store; and providing the natural-language query answer as a search result for the query.

14. The search system of claim 11, wherein the regular expression includes at least one variable portion representing a parameter and the computer-language instructions for accessing the data store include instructions for using a portion of the query matching the variable portion and the parameter to access the data store.

15. The search system of claim 11, wherein a plurality of query templates are received from the third party, each query template being a regular expression, at least one query template of the plurality of query templates including a variable portion representing a parameter, and wherein the computer-language instructions for accessing the data store include instructions for using a portion of the query that matches the variable portion and the parameter to access the data store responsive to the query template triggering the third-party search application.

16. The search system of claim 11, wherein a plurality of query templates are received from the third party, each query template being a regular expression, at least one query template of the plurality of query templates lacking a variable portion, wherein the computer-language instructions for accessing the data store include instructions for using a context of the query to identify a parameter value used to access the data store responsive to the at least one query template triggering the third-party search application.

17. The search system of claim 11, wherein the query is an audio query.

18. A search system comprising:

at least one processor; and memory storing instructions that, when executed by the at least one processor, cause the search system to perform operations comprising:

determining that a query triggers a third-party search application hosted at the search system based on a query template, the query template being a regular expression obtained from the third party and stored at the search system, wherein the query triggers the third-party search application responsive to each character in the query corresponding to a fixed portion of the regular expression or to a variable portion of the regular expression, executing computer-language instructions obtained from the third party for generating a third-party formatted natural language answer for the query and for formatting the natural language answer, the computer-language instructions being stored at the search system and the executing occurring at the search system without communicating with a third party site, and providing the third-party formatted natural language answer as a search result for the query.

19. The search system of claim 18, the memory further storing instructions that, when executed by the at least one processor, cause the search system to extract a parameter value from the query, the parameter value being characters of the query that correspond to the variable portion, and to use the parameter value to generate the third-party formatted natural language answer.

20. The search system of claim 18, wherein determining that the query triggers the third-party search application includes:

determining that the query includes a pronoun; and substituting the pronoun in the query with a noun from a previous query submitted by a requester of the query.

21. The search system of claim 18, wherein the memory also stores instructions that, when executed by the at least one processor, causes the search system to obtain a parameter value from a context of the query, the parameter value being used to generate the third-party formatted natural language answer.

* * * * *

UNITED STATES PATENT AND TRADEMARK OFFICE
CERTIFICATE OF CORRECTION

PATENT NO. : 10,289,618 B2  
APPLICATION NO. : 16/029758  
DATED : May 14, 2019  
INVENTOR(S) : Fink et al.

Page 1 of 1

It is certified that error appears in the above-identified patent and that said Letters Patent is hereby corrected as shown below:

In the Claims

In Column 22, Claim 11, Line 8, delete "the data for" and insert --the--, therefor.

Signed and Sealed this  
Twentieth Day of August, 2019

Andrei Iancu  
*Director of the United States Patent and Trademark Office*